United States Patent
Laible

[15] 3,669,413
[45] June 13, 1972

[54] ELECTRICAL FENCE CONSTRUCTION
[72] Inventor: Ralph L. Laible, 14008 North 24th Street, Route 6, Omaha, Nebr. 68112
[22] Filed: Nov. 9, 1970
[21] Appl. No.: 87,979

[52] U.S. Cl..................................256/10, 256/47, 256/50
[51] Int. Cl............................................................E01k 3/00
[58] Field of Search..................256/10, 53, 50, 47, 48, 57, 256/58; 174/158 F, 158 R, 161 F, 166 S

[56] References Cited

UNITED STATES PATENTS

| | | |
|---|---|---|
| 3,080,149 | 3/1963 | Pilboue.............................256/10 X |
| 774,295 | 11/1904 | Wheeler...............................256/53 |
| 2,011,716 | 8/1935 | Johnson...............................256/58 |
| 2,429,857 | 10/1947 | Verner.............................256/48 X |
| 2,791,625 | 5/1957 | Swanson...........................256/10 X |
| 2,821,365 | 1/1958 | Lach................................256/10 X |
| 2,865,609 | 12/1958 | Steiner.................................256/10 |
| 3,377,054 | 4/1968 | Thron.................................256/47 |
| 3,457,358 | 7/1969 | Brumfield.........................256/10 X |
| 3,464,671 | 9/1969 | Thomas............................256/48 X |
| 3,491,985 | 1/1970 | Grimsley.............................256/47 |

Primary Examiner—Dennis L. Taylor
Attorney—George R. Nimmer

[57] ABSTRACT

There is described electrical fencing comprising a plurality of upright elongate fence posts, each fence post comprising an upright rigid metallic-rod adapted to be embedded into the earth, said metallic-rod carrying an uprightly extending resinous electrically-insulative resinous sheath disposed at an elevation common to the fencing current-carrying conductor wire(s). Although the conductor wire might be tied directly to the fence post external resinous sheath, preferably an intervening C-shaped wire-connector member is utilized which is removably frictionally engaged at a selectable continuum of elevations along the fence post sheath. The lower portion of the fence post might include an angular anchor-plate admirably suited to maintain the fence post perpendicular to the earth's surface.

3 Claims, 8 Drawing Figures

PATENTED JUN 13 1972
3,669,413
SHEET 1 OF 2

RALPH L. LAIBLE
INVENTOR.

BY George P. Minimum
ATTORNEY

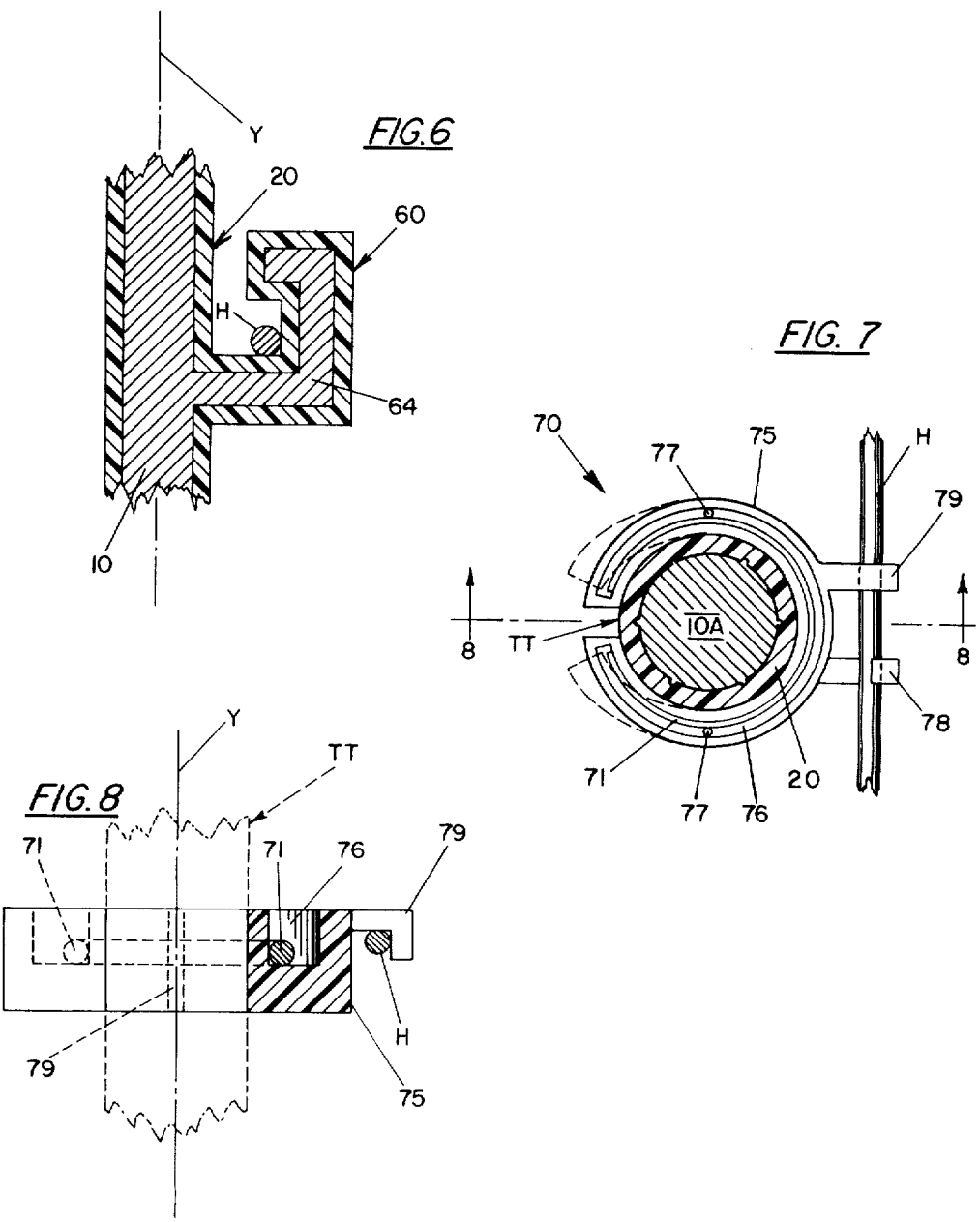

ELECTRICAL FENCE CONSTRUCTION

Electrical fences are commonly used in farming districts and similar open terrain to provide a secure enclosure for cattle and other pasture stock. In this vein, electrical fences prevent ingress and egress to the fenced enclosure by virtue of uninsulated current-carrying conductor wires held above and substantially parallel to the earth's surface by a plurality of incrementally spaced upright fence posts embedded into the earth. There is necessarily some type of means to electrically isolate the current-carrying wires from the earth to ensure that the electric current effectively travels horizontally along the enclosure periphery rather than being vertically "grounded" or shunted to the earth at a fence post station. Such electrical isolation has usually been attained in the prior art by interposing an electrically insulative wire-connector between the fence post and the current-carrying wire, although some prior art workers have made ineffective or uneconomical attempts to effect the electrical isolation within the fence post itself. Moreover, the prior art has had difficulty in uprightly stably anchoring the common rod-like fence posts into earth, and in providing a continuum of selectable vertical heights for the one or more current-carrying conductor wires.

It is accordingly the general object of the present invention to provide an electrical fence construction having a plurality of economical rigid rod-like fence posts securely embeddable into the earth, wherein the presence of an electrically isolative wire-connector between the rod-like fence post and the current-carrying wire is unnecessary, or purely optional.

It is another object of the present invention to provide an economical fence post that tends to remain desireably perpendicular to the earth's surface for long periods of time.

It is a further object to provide an electrically insulative wire-connector member that is readily vertically movable along an upright rod-like fence post whereby the height of the current-carrying wire above the earth's surface can be selectively and continuously varied, and indefinitely maintained at the chosen height. It is an ancillary object to provide a said wire-connector member than can be safely manually vertically moved to a selected height without the use of special tools.

With the above and other objects and advantages in view, which will become more apparent as the description herein proceeds, the electrical fencing of the present invention generally comprises a plurality of upright fence posts, the individual fence posts including an elongate rigid metallic-rod loftily extending along an upright vertical-axis together with an uprightly extending resinous electrically insulative sheath completely surrounding and attached to the metallic-rod whereby an elongate uninsulated conductor wire is securely removably attachable to a sheathed elevation of the fencing post. Preferably, there is an intervening novel wire-connector member between the uninsulated conductor wire and the fence post sheathed portion, said wire-connector comprising a resiliently expandable C-shaped portion adapted to frictionally engage a sheathed portion of the fence post. Moreover, the lower portion of the fencing post might carry an angular anchor-plate that is unusually suited to maintain the fencing post perpendicular to the earth's surface.

In the drawing, wherein like characters refer to like parts in the several views, and in which:

FIG. 6 is a sectional fragmentary elevational view similar to FIG 2 showing a fence post embodiment with a structurally continuous integral protuberance with respect to the fence post lofty metallic-rod portion.

FIG. 7 is a sectional plan view similar to FIG 3 showing another alternate embodiment C-shaped type wire-connector, and also showing advantageous use of an irregularly surfaced metallic-rod immediately adjacent to the resinous sheath of the sheathed fence post.

FIG. 8 is a sectional elevational view of the alternate embodiment wire-connector taken along line 8—8 of FIG. 7.

Figure 1:
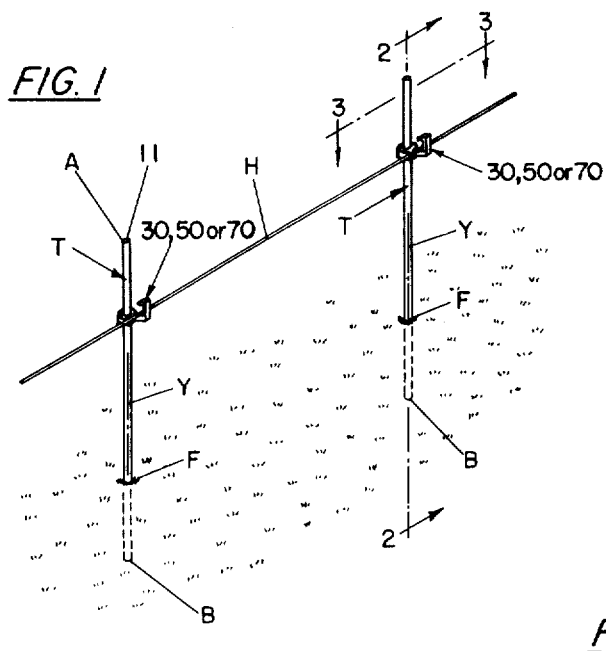
FIG. 1 is a perspective view of a typical length of electrical fencing wherein the novel sheathed fence post of the present invention is employed to maintain one or more elongate uninsulated conductor wires in elevation above and in general parallelism with the earth's surface.

FIG 1 discloses a representative length of typical electrical fencing for the novel sheathed fence post of the present invention. There is a plurality of elongate upright fence posts "T" embedded into the earth "E" whereby the lower end "B" of each fence post "T" is located some few inches below the earth's surface "F." Moreover, each fence post "T" extends longitudinally along an upright vertical-axis "Y" that is substantially perpendicular to the earth's surface. One or more elongate current-carrying conductor wires (herein as uninsulated wire "H") is each supplied with electrical current from a remote source (not shown) and passes transversely alongside each fence post eg "T," above the earth's surface and in substantial parallelism therewith. Although it is permissible that the conductor wire(s) "H" be tied directly to the longitudinally extending electrically insulative sheathed length e.g. 20, of the novel fence post herein, it is sometimes preferable to utilize an intervening wire-connector member e.g. 30, 50, 70.

Turning initially to FIGS. 1–4, the said vertically uprightable representative fence post "T" having upper end "A" and lower end "B" comprises an elongate rigid metallic-rod 10 along the entire upright length of post "T." Thus, metallic-rod 10 extends loftily along vertical-axis "Y" and has an upper-end 11 at "A" and a lower-end 12 at "B." Metallic-rod 10 has sufficient rigidity that the lower-end 12 thereof might be embedded into the earth "E" through compressive forces exerted along the metallic-rod vertical-axis "Y" as through upper-end 11, or through an optional anchoring-plate 40. For example, metallic-rod 10 might be in the form of a cylindrical solid iron rod having a diameter of typically one-fourth to one-half inch.

There is an electrically insulative upright sheath 20 extending along and attached to metallic-rod 10, said sheath 20 completely surrounding metallic-rod 10 and vertical-axis "Y." The said sheath 20 extends for at least two inches vertically along an uninterrupted length of metallic-rod 10. The sheath top-end must be located above the highest permissible elevation for the uppermost conductive wire e.g. "H;" herein, sheath top-end 21 is at metallic-rod upper-end 11. Analagously, the sheath bottom-end must be located below the lowest permissible elevation for the lowermost conductor wire e.g. "H;" herein, the bottom-end 22 of sheath 20 is at metallic-rod lower-end 12. Electrically insulative sheath 20 comprises a chemically homogeneous structurally continuous hydrophobic resinous material as the major gravimetric proportion thereof, and preferably such major proportion exceeds 80 percent. The presence of fillers, pigments, and similar inorganic materials tend to decrease the electrically insulative properties of the sheath, and such inorganic materials should gravimetrically comprise no more than a minor proportion of the sheath structural material. The above described resinous sheathing completely surrounding and attached to the metallic-rod has been found to provide adequate insulation between the metallic-rod 10 and uninsulated conductor wires to the extent that the conductor wire might be wrapped directly securely upon the sheathed portion without the use of an intervening electrically insulative wire-connector e.g. 30, 50, 70.

There are two basic methods by which the resinous sheath might be affirmatively attached to the metallic-rod. First, there is the "tubular sleeve" method wherein the metallic-rod is inserted axially along a cross-sectionally similar tubular resinous sleeve. The resinous tubular sleeve might be of a thermoplastic resin, which is later thermally adhered directly to the metallic-rod as alluded to in FIG. 7; alternatively, an intervening layer of adhesive might be employed between the sleeve and the metallic-rod, analagous to annular layer 29. Second, there is the "amorphous application" method wherein an amorphous flowable form of the resinous material is adherently applied to the metallic-rod. For example, the metallic-rod (perhaps also including anchor-plate 40) might be briefly dipped into or extruded through a "hot melt" of a suitable thermoplastic resin. Or alternatively, a suitable resin (thermoplastic or thermosetting) might be admixed with volatile solvent to provide a "lacquer;" the lacquer is then sprayed, coated, or dip-coated onto the metallic-rod, and subsequently dried to provided the adherent resinous sleeve. The full length type sheath arbitrarily selected for the FIGS. 1–4 embodiment, is readily attained with the lacquer dip-coating variety of "amorphous application," said method resulting in a uniformly thin and economical sheath. Specifically, the resinous material utilized for sheath 20 of FIGS. 1–4 comprises a solid thermoplastic polymer of cellulose acetate butyrate, said material being hydrophobic, tough, highly weather-resistant, and exceedingly adherent to ferrous metallic-rod 10. The sheath 20 is preferably about 10 mils thick, at a coating weight of two grams per square inch. Adhesion between sheath 20 and smoothly surfaced ferrous metallic-post 10 was found to be enhanced by twice dip-coating the metallic-rod in lacquer, the first dip-coat being of higher solvent content to provide an annularly thinner but more adherent intervening primer layer 29 (FIG. 3).

Figure 4:
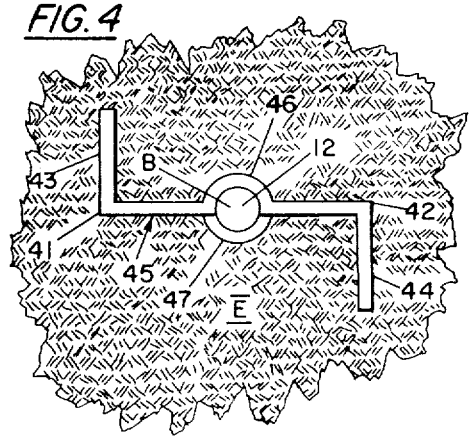
FIG. 4 is a bottom view of the FIG. 1 embodiment taken along line 4—4 of FIG. 2.

As can best be seen in FIG. 4, anchoring-plate 40 is affirmatively attached to metallic-rod 10 and is located nearer to lower-end 12 than to upper-end 11 and embeddable downwardly through the earth's surface "F." Anchoring-plate 40 is provided of a single triangular piece of rigid but thin sheet metal (such as 1 millimeter strap iron), a central portion 45 being transverse of and attached to metallic-rod 10. The single metal piece is provided with two permanent right-angle vertical bends 41 and 42 disposed on opposite sides of vertical-axis "Y." Thus, as can best be seen in FIG. 4, angular anchor-plate 40 includes two terminal ears 42 and 44 extending perpendicularly in opposite directions from the anchor-plate central portion 45. Accordingly, when anchoring-plate 40 is embedded into the earth "E," the right-angle relationship between portions 42, 44, and 45, tends to ensure that the fence post remains vertically perpendicular with respect to the earth's surface "F." Exceedingly secure engagement between the anchoring-plate 40 and the metallic-rod 10 is attained when the central portion 45 is integrally provided with semi-circular bent straps, e.g. 46, 47, each weldable strap being adapted to partially surround circular metallic-rod 10. As is shown in FIG. 2, sheath 20 may optionally extend downwardly to metallic-rod lower-end 12, including anchoring-plate 40.

It is oftentimes desireable that there be a readily removable attachment between the fence post and the uninsulated wire conductor, and for such purpose, a suitable intervening wire-connector member has been traditionally employed. Moreover, it is oftentimes desireable that the uninsulated wire conductor have a selectable elevation with respect to the earth's surface, and for such purpose, wire-connector members adapted to be attached to the fence post at one or more selectable elevations have been developed. The novel wire-connector member, e.g. 30, 50, 70, of the present invention is unusally suited to provide a readily removable attachment of continuous selectable elevation for the uninsulated wire conductor. Wire-connector members 30 and 70 each comprise a springy metallic C-shaped portion, e.g. 31, 71, partially surrounding the fence post longitudinal vertical-axis and adapted to frictionally engage the upright external surfaces of the fence post. Moreover, the C-shaped portion is resiliently expandable (as indicated in phantom line in FIG. 3) whereby the vertical elevation of the wire-connector can be continuously selectably varied appropriate to the desired height of the wire conductor, e.g. "H."

Figure 2:
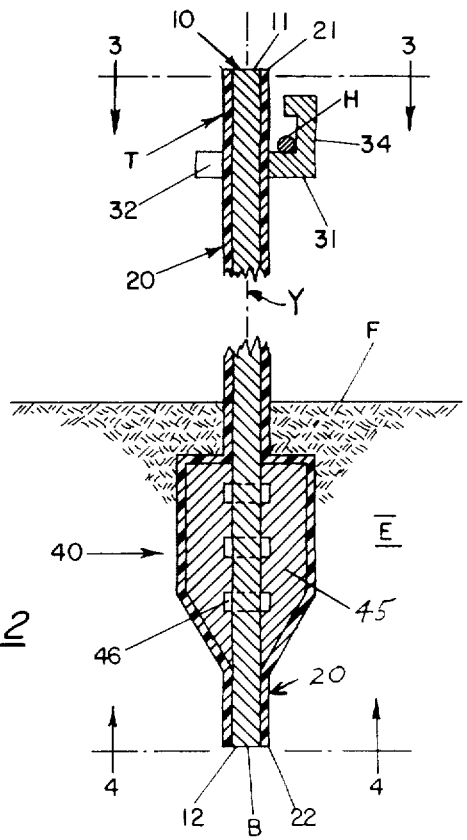
FIG. 2 is an enlarged sectional fragmentary elevational view taken along line 2—2 of FIG 1 to show certain novel features of the upright sheathed fence post of the present invention, together with the preferred type C-shaped wire-connector member, and also an angular anchor-plate to ensure perpendicularity of the sheathed fence post with respect to the earth's surface.
Figure 3:
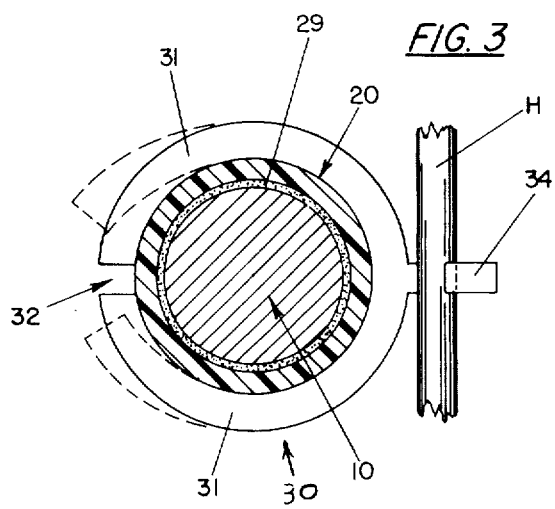
FIG. 3 is a sectional plan view taken along lines 3—3 of FIGS. 1 and 2.
Figure 5:
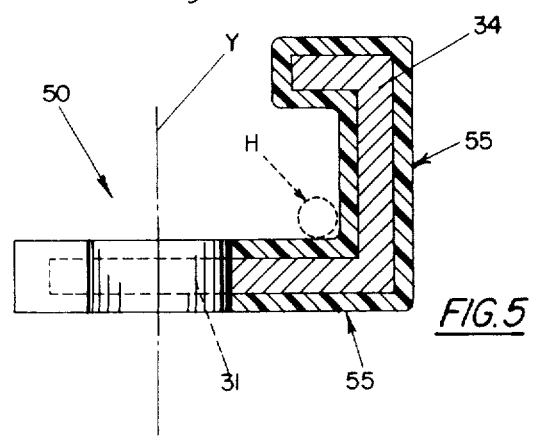
FIG. 5 is a sectional elevational view similar to FIG. 2 showing an alternate embodiment C-shaped type wire-connector.

For the wire-connector member 30 of FIGS. 1–3, the resiliently expandable C-shaped portion 31 (having gap 32) is wholly provided of a single uninsulated piece of springy metal which is removably attached to fence post "T" through frictional engagement with resinous sheath 20. Extending integrally uprightly from C-shaped portion 31 (diametrically opposite gap 32) is a metallic tab 34 of L-shaped configuration which is transversely offset from fence post "T" whereby wire conductor "H" is supportable between sheath 20 and tab 34. Fence post "T" has an arbitrary finite-length portion extending along vertical-axis "Y" which is of regular transverse cross-sectional size and shape, and the resiliently expandable C-shaped portion 31 might be continuously vertically reciprocated along said arbitrary finite-length to any desired employable elevation. The wire-connector 50 of FIG. 5 differs from embodiment 30 of FIGS. 1–3 in that the metallic portions 31 and 34 adherently carry a resinous electrically insulative coating 55 which provides additional electrically insulative protection between the conductor wire and the fence post.

Wire-connector embodiment 70 of FIGS. 7 and 8 differs from embodiment 50 in that the resiliently expandable C-shaped metallic portion 71 is separable from the C-shaped resinous body portion 75. The C-shaped metallic portion 71 is non-adherently seated within a larger C-shaped groove 76 of resinous body 75 whereby the entire resinous body 75 is resiliently expandable (as indicated in phantom line in FIG. 7). There are vertical holes 77 through resinous body 75 at groove 76 to prevent water accumulation thereat. Resinous body 75 integrally includes a pair of parallel lugs 78 and 79 which extend in opposite vertical directions to very securely engage the conductor wire therebetween. The fence post "TT" of FIGS. 7 and 8 differs from fence post "T" of FIGS. 1–3 in that the upright surfaces of metallic-rod 10A are knurled or similarly roughened to increase adhesion between the metallic-rod and the resinous sheath 20, rather than utilizing primer layer 29 for such purpose.

FIG. 6 illustrates the situation wherein the metallic-rod 10 integrally includes an L-shaped protruding tab 64 in structurally continuous relationship therewith. When the adherent resinous sheath 20 also covers tab 64, a fixed elevation wire-connector embodiment 60 results.

From the foregoing, the construction and operation of the electrical fencing device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A vertically uprightable fence construction wherein a plurality of fence posts embedded into the earth together with wire-connector members are adapted to maintain at least one current-carrying conductor wire in substantial parallelism with the earth's surface, said electrical fence construction comprising:

A. An elongate rigid metallic-rod having a lofty height extending along an upright vertical-axis whereby said metallic-rod has an upper-end and a lower-end, said metallic-rod having sufficient rigidity and compressive strength that the lower-end thereof might be embedded downwardly below the earth's surface through compressive forces exerted along the metallic-rod vertical-axis, an upright finite-length of said metallic-rod having a regular transverse cross-sectional size and shape;

B. An electrically insulative uprightly extending sheath completely surrounding and affirmatively attached along the rigid metallic-rod upright finite-length, said sheath being chemically homogeneous and comprising at least one-half by weight a structurally continuous hydrophobic resinous material; and C. A wire-connector member removably attached to the resinous sheathed portion of the metallic-rod, said wire-connector member including a resiliently expandable horizontal C-shaped resinous insulator portion surrounding and frictionally engaged with the metallic-rod resinous sheathed portion, said wire-connector including a resiliently expandable C-shaped metallic component that is radially spaced from the frictional contact between the wire-connector and the metallic-rod resinous sheath.

2. The electrical fence post of claim 1 wherein the sheath resinous material comprises a thermoplastic polymer of cellulose acetate butyrate.

3. The electrical fence post of claim 1 wherein the resinous insulator component of the wire-connector member includes at least one vertical drainage hole therethrough and also includes a pair of oppositely extending resinous tabs which are uprightly coparallel, said two tabs being adapted to removably engage therebetween a generally horizontal current-carrying conductor wire.

* * * * *